US007954098B1

(12) United States Patent
Martin et al.

(10) Patent No.: US 7,954,098 B1
(45) Date of Patent: May 31, 2011

(54) SYSTEM AND METHODS FOR SAN AGENT INSTALLATION

(75) Inventors: Sylvia J. Martin, Shrewsbury, MA (US); Mordechai Zvi Zur, Newton, MA (US); Anoop George Ninan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1630 days.

(21) Appl. No.: 11/094,494

(22) Filed: Mar. 30, 2005

(51) Int. Cl.
*G06F 9/445* (2006.01)
(52) U.S. Cl. .................................. 717/176; 717/177
(58) Field of Classification Search .................. None
See application file for complete search history.

(56) References Cited

U.S. PATENT DOCUMENTS

| | | | | |
|---|---|---|---|---|
| 6,918,112 | B2* | 7/2005 | Bourke-Dunphy et al. | 717/177 |
| 7,587,713 | B1* | 9/2009 | Barrett et al. | 717/168 |
| 2002/0147974 | A1* | 10/2002 | Wookey | 717/176 |
| 2003/0159137 | A1* | 8/2003 | Drake et al. | 717/172 |
| 2004/0015961 | A1* | 1/2004 | Chefalas et al. | 717/178 |
| 2004/0024854 | A1* | 2/2004 | Mandal | 709/223 |
| 2004/0030768 | A1* | 2/2004 | Krishnamoorthy et al. | 709/223 |
| 2004/0249920 | A1* | 12/2004 | Ogasawara et al. | 709/223 |
| 2005/0198631 | A1* | 9/2005 | Bisher et al. | 717/178 |

OTHER PUBLICATIONS

Milanovic et al, Building the Enterprise-wide Storage Area Network, International Conference on Trends in Communications, 2001, vol. 1 pp. 136-139, Retrieved on [Jan. 14, 2011], Retrieved from the Internet: URL<http://ieeexplore.ieee.org/stamp/stamp.jsp?tp=&arnumber=937782>.*
Robison et al, Discovery Agent Deployment in Diverse SAN Environments, IEEE International Conference on Information Reuse and Integration, 2005, pp. 439-444, Retrieved on [Jan. 14, 2001], Retrieved from the Internet: URL<http://ieeexplore.ieee.org/xpls/abs_all.jsp?arnumber=1506513>.*

* cited by examiner

*Primary Examiner* — Chameli C. Das
*Assistant Examiner* — Cheneca Smith
(74) *Attorney, Agent, or Firm* — Gerald P. Kazanjian; Krishnendu Gupta

(57) ABSTRACT

A bulk install which evaluates prerequisites and performs installations of agents for multiple remote host computers performs a prerequisite check to identify prerequisite files, resources, or other objects expected by each agent on the hosts, and identifies potential shortcomings or failures before installation. A GUI identifies agents for installation on a plurality of host computers, which allows agent specification on an agent type, operating system, or individual host basis. Install files for each agent are identified and retrieved from a common media repository for transport to the target host. The prerequisite checks are also performed in bulk prior to the bulk install, such that the checks prevent a failed prerequisite check from disrupting an entire install. Such bulk install operations mitigate the time-consuming, repetitive nature of the conventional single agent install by iteratively installing each of the agents on the proper host.

23 Claims, 13 Drawing Sheets

SYSTEM AND METHODS FOR SAN AGENT INSTALLATION

BACKGROUND

A storage area network (SAN) typically interconnects many mass storage devices, commonly known as storage arrays, with a set of users for providing data storage and retrieval services to the user community. The storage area network includes a plurality of nodes for providing the information retrieval services to the users, including host computers, storage arrays, connectivity devices, and databases. The host computers execute software entities known as agents for monitoring and managing the various nodes in the SAN. In a large storage area network, the number of nodes may be substantial. Accordingly, users typically find it beneficial to operate a management application for monitoring and controlling the various nodes in the SAN.

Conventional management applications deploy agents on host computers (hosts) in the SAN for effecting management and control operations. A variety of different types of agents are available for deployment, and generally monitor and manage a particular type of node, or manageable entity. Further, the agents are typically provided for each of a plurality of operating systems which may be available on the particular host computer on which the agents are deployed. Accordingly, in a large SAN, many agents are deployed on multiple host nodes throughout the SAN. The deployed agents monitor and manage various SAN for providing command and control capability from a user console via a server coupled to the console.

SUMMARY

In a large storage area network, many agents are deployed on various host computers (hosts) throughout the network. The agents correspond to a plurality of manageable entities in the SAN, such as storage arrays, connectivity devices, and databases. Further, the agents correspond to a plurality of operating systems from various vendors, such as Windows 2000, Windows XP, IBM MVS, AIX and HP/UX, to name several. Accordingly, each host in the SAN is operable to execute a plurality of various types of agents specific to the manageable entities and OSs available.

In the storage area network, the agents monitor and manage entities such as storage arrays, connectivity devices, and databases (all collectively known as manageable entities or resources). The agents are software entities executed on the host computers in proximity with the manageable entities which the agents monitor and/or manage. There are many types of agents, which correspond to the manageable entities they are to manage, for example a storage array agent or a DB agent, and are specific to the operating system of the host computer on which they run. Accordingly, a typical storage area network configuration deploys multiple agents on one or more host computers depending on the number and arrangement of the manageable entities in the storage area network (SAN).

Configurations of the invention are based, in part, on the observation that deployment of agents in a large storage area network having many hosts each managing multiple manageable entities is a formidable effort. Each agent requires an accompanying set of support files such as startup files, unzip procedures, and file placement operations. Further, there are a number of agent types, each applicable to one of several operating systems available on a host computer. Accordingly, deploying, or installing, agents involves determining which agent and related files are needed on a particular host, copying the proper set of objects (files) to that agent, and ensuring that the proper runtime resources are available for the agent to execute.

Conventional mechanisms for installing agents suffer from several shortcomings. In a large storage area network, the number of agents for installation may be substantial. Performing individual copy operations for each agent and related files is a time-consuming process. Further, depending on the remoteness and capability of a target host computer, an installation procedure for a particular agent may span an unacknowledged interval of several minutes, possibly tempting an inexperienced user to attempt to duplicate the procedure (i.e. to keep clicking "GO" or "START." Due to the multiplicity of agent types and operating systems, opportunities for errors may be introduced, thus requiring repeated attempts to install a particular agent.

Further, certain agents have particular constraints, or conditions, which are either desirable or mandatory for successful installation and operation. Without such constraints satisfied, operation of the agent may be diminished or unavailable. Such constraints are identified as prerequisites for each agent in a configuration file or other suitable arrangement. Accordingly, installation of a particular agent includes analyzing, or checking, the prerequisites for that agent to ensure an operational environment. Such prerequisites include, for example, sufficient disk space, other agents, and support services such as database access processes.

Prerequisites may be thought of as dependencies of one entity upon another, such as processes (i.e. other agents), files, or other resources (i.e. disk space or transmission speed). Such dependencies are expressible in a variety of ways, such as rules, trees, nested lists, etc. For example, a prerequisite check might be expressed as "IF server A requested THEN check store process B present," or as a set of tree nodes "Process B," "File C", and "transmission Line D" as children of the "Server A" node. Other representations will be apparent to those of skill in the art.

Configurations discussed further below identify a plurality of agents for installation as a task to be run as a batch, or bulk operation. Such bulk install operations mitigate the time-consuming, repetitive nature of the conventional single agent install by iteratively installing each of the agents on the proper host. However, a lack of the proper prerequisites for one or more of the agents can prematurely interrupt the bulk install after only partial completion.

Configurations of the claimed invention substantially overcome the above described shortcomings presented by individual agent installs by providing a bulk install mechanism which evaluates prerequisites and performs installations of agents for multiple remote host computers. Agents for installation on a plurality of host computers are identifiable via a Graphical User Interface (GUI), which allows agent specification on an agent type, operating system, or individual host basis. Install files for each agent are identified and retrieved from a common media repository for transport to the target host. A master agent operates on each host for facilitating and coordinating transport of the agent install objects (i.e. files) according to a messaging sequence between the master agent and a common server for managing the SAN. A prerequisite check identifies prerequisite files, resources, or other objects expected by each agent on the host, and identifies potential shortcomings or failures before installation. Further, the prerequisite checks are also performed in bulk prior to the bulk install, thus preventing a failed prerequisite from disrupting an entire install. In this manner, a user or operator specifies, via the GUI, agents targeted for installation on each of a plurality of remote or local host computers, and a bulk installer transfers the required files and other prerequisite objects to each host computer for the requested agents, eliminating the tedious, operator intensive, conventional single agent install sequence. In this manner, a user or operator may specify a set of agents and corresponding hosts for installation, and the management application performs prerequisite checks and installs the requested agents on the corresponding hosts.

In further detail, the method of installing agents in a managed information environment includes receiving a request to install a set of agents on a host computer, in which the agent is operable for monitoring managed objects in the managed information environment, and identifying a set of prerequisite entities corresponding to each of the requested agents. The management application performing the install receives a check result indicative of the status of the identified set of prerequisite entities on the host for installation, and determines, based on the check result, whether the set of prerequisite entities is operable to support each of the requested agent on the respective host. The management application then enumerates, if the check result is indicative of insufficient prerequisite entities, characteristics of the insufficient prerequisite entities on a GUI screen.

The user request is typically indicative of a request to install a plurality of agents on at least one host computer, and includes identifying, for each of the requested agents, a corresponding set of prerequisite entities, in which the prerequisite entities are based on an agent type and operating system of the particular host computer. The management application evaluates, for each of the host computers, the check result, in which the check result is indicative of each requested agent for each particular host computer. The management application aggregates the check results for each of the host computers for GUI display, in which the aggregation is indicative of a collective demand of prerequisite entities of the agents requested for the particular host computer. The management application then iterates, for each of the host computers and respective agents requested on each host computer, through the prerequisite evaluation.

In particular configurations, the installation further includes identifying an agent type for installation, identifying an OS corresponding to the host computer; and traversing a media repository having OS specific install folders for each of a plurality of agents, in which the install folder includes executable objects, prerequisite check scripts, and startup files for the particular agent. The management application identifies an install folder corresponding to the identified agent and OS, and transports the contents of the identified folder to the host computer. In the exemplary configuration, the install request is for a plurality of agents, and includes identifying, in a media repository of install suites (i.e. kits), a particular install suite corresponding to each requested agent, and installing the requested agent on each of the respective requested host computers.

In the exemplary configurations, a GUI receives user input responsive to the enumerated insufficient prerequisite entities, and allows selective installation, based on the determination of the insufficient entities, the requested agents on the host. Further, the GUI displays, to a user, an accumulation of aggregate check result for each of the iteratively evaluated host computers and respective agents, and receives, for each of the host computers, from the user, an indication of whether to proceed with installation of each particular agent on each host computer. Further, the GUI operation of displaying agents to the user for receiving an indication to proceed further includes receiving an indication of agents previously installed on the host computer. The management application compares the previously installed agents to available agents in the media repository, in which comparing further includes matching the agent, operating system, and version of the respective installed agents, and displaying, in response to the comparing, agents which are candidates for installation.

In particular configurations, installation includes, on each respective host computer, installing a master agent operable for receiving each of the successive install suites, commencing the master agent on the respective host computer, and receiving an indication from the master agent of an ability to receive and install successive requested agents. Accordingly, installation includes sending, to the master agent on the host computer, a prerequisite instruction set (prerequisite check) and an expected result, in which the master agent is operable to perform the prerequisite instruction set and generate a log script indicative of the results. The management application receives the check result from each of the master agents and displays the check result for each of the prerequisite entities, in which displaying further including listing characteristics of an insufficient prerequisite.

In an exemplary arrangement, the master agent on each of the hosts is further operable to receive the prerequisite instruction set and expected result, and execute, for each of the prerequisite entities, the prerequisite instruction to compute a check result. The master agent compares the computed check result to the expected result, and generates, if the check result does not match the expected result, the characteristics indicative of the causes of the check result. Further, in the event of a failed prerequisite check, the management application identifies prerequisites operable for automatic intervention by a server, informs the user of a proposed remedial operation for correcting the computed prerequisite insufficiency; and remedies the cause of the insufficient prerequisite.

In particular arrangements, the management application defines a task operable to perform the installation for the plurality of agents on the plurality of host computers, in which the task further includes actions, each action having at least one instruction. The management application orders the tasks according to computed dependencies in the collective set of tasks.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for performing a bulk install which evaluates prerequisites and performs installations of agents for multiple remote host computers. The GUI identifies agents for installation on a plurality of host computers, which allows agent specification based on an agent type, operating system, or individual host basis. Install files for each agent are identified and retrieved from a common media repository of install suites, or kits, for transport to the target host. A master agent operates on each host for facilitating and coordinating transport of the agent install objects (i.e. files) according to a messaging sequence between the master agent and a common server for managing the SAN. The GUI screen sequence identifies a plurality of agents for installation as a task to be run as a batch, or bulk operation. Such bulk install operations mitigate the time-consuming, repetitive nature of the conventional single agent install by iteratively installing each of the agents on the proper host.

As indicated above, however, a lack of the proper prerequisites for one or more of the agents can prematurely interrupt the bulk install after only partial completion. Therefore, a prerequisite check identifies prerequisite files, resources, or other objects expected by each agent on the host, and identifies potential shortcomings or failures before installation. Since the prerequisite checks are also performed in bulk prior to the bulk install, such checks prevent a failed prerequisite from disrupting an entire install. In this manner, a user or operator specifies, via the GUI, agents targeted for installation on each of a plurality of remote or local host computers, and a bulk install operation transfers the required files and other prerequisite objects to each host computer for the requested agents, eliminating the tedious, operator intensive, conventional single agent install sequence. Therefore, the user simply specifies set of agents and corresponding hosts for installation, and the management application performs prerequisite checks and installs the requested agents on the corresponding hosts.

Figure 1:
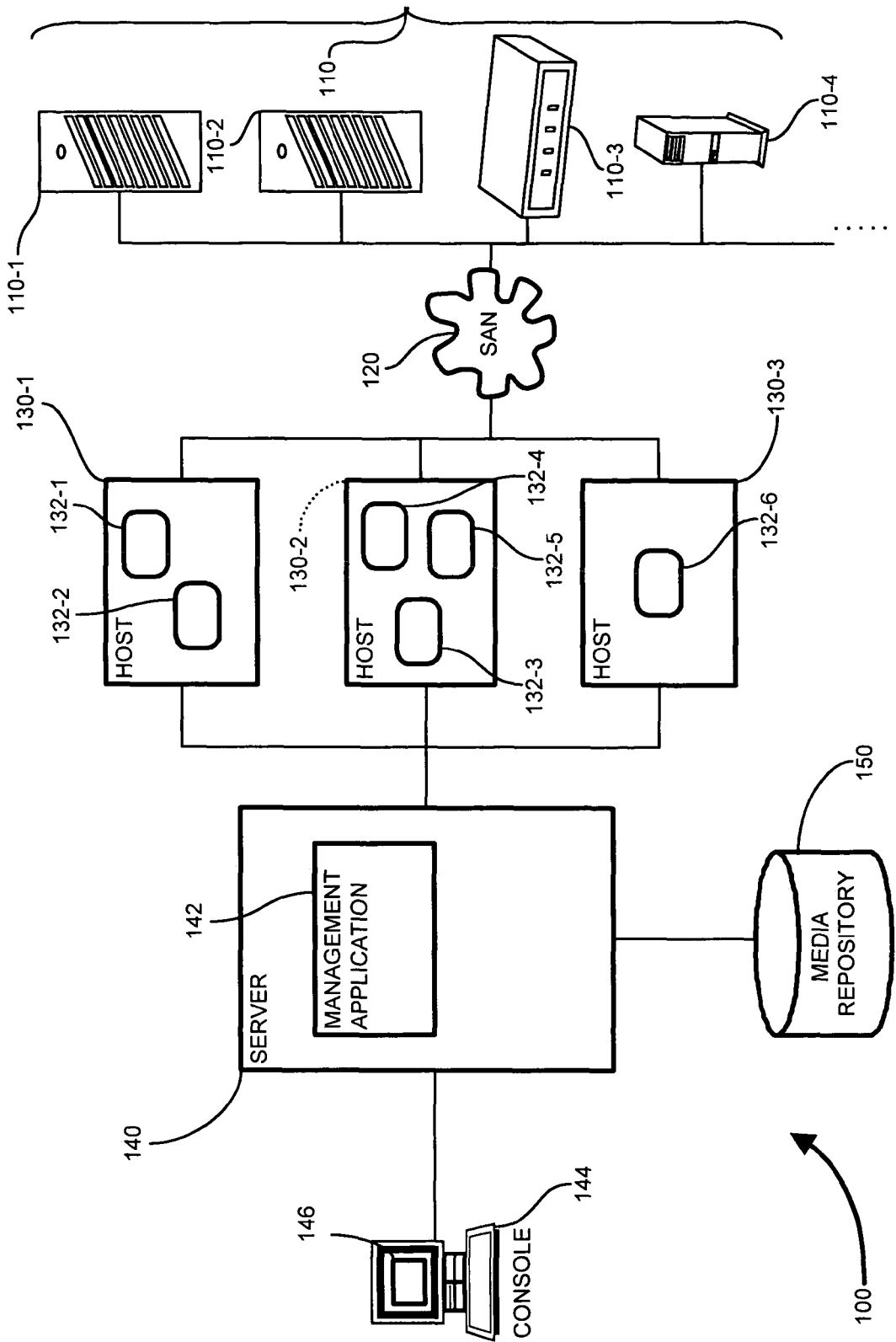
FIG. 1 is a context diagram of an exemplary managed information environment suitable for use with the present invention.

FIG. 1 is a context diagram of an exemplary managed information environment suitable for use with the present invention. Referring to FIG. 1, a managed information environment 100 includes a plurality of manageable entities 110-1 ... 110-N (110 generally), such as storage arrays 110-1, 110-2, connectivity devices 110-3, and database servers 110-4 interconnected to a plurality of hosts 120-1 ... 120-3 (120 generally) by a storage area network 120. The hosts 130 execute one or more agents 132-1 ... 132-6 (132 generally) for monitoring and managing the manageable entities 110. The hosts 130 connect to a server 140 having a management application 142 responsive to a console 144. Each of the agents 132 is further responsive to the management application 142 for managing the manageable entities 110. The server 140 also connects to a media repository 150 for storing the agents 132 in executable form, along with related support files for employing the agents throughout the SAN 120, discussed further below. Note that the SAN 120, shown in an exemplary manner between the hosts 132 and manageable entities 110, serves to interconnect the server 140, hosts 130 and manageable entities 110. Hosts 132 may or may not be disposed proximate to the manageable entities 110 which they manage, and the server 140 may employ a SAN connection to the various hosts 130. It will be apparent to those of skill in the art that a variety of networking options are available among the SAN nodes, such as optical (fiber channel), Small Computer Systems Interface (SCSI), T1, E1 and other mediums.

In operation, the management application 142 controls starting and stopping of the various agents 132, as well as transferring executable files corresponding to the agents in the SAN 120. The agents 132, in turn, communicate with one or more manageable entities 110 in the SAN for monitoring and managing the manageable entities 110 and reporting and receiving status and instructions, respectively, with the management application 142. The agents 132 are each of a particular type, operable to manage a particular type of manageable entity 110. Further, the agents 132 are specific to a particular operating system of the host computer on which they run (execute), such as AIX, Windows 2000 (W2000), Windows XP (WXP), MVS, HP-UX, SUN/Solaris, Linux, etc. as are known in the industry.

Figure 2:
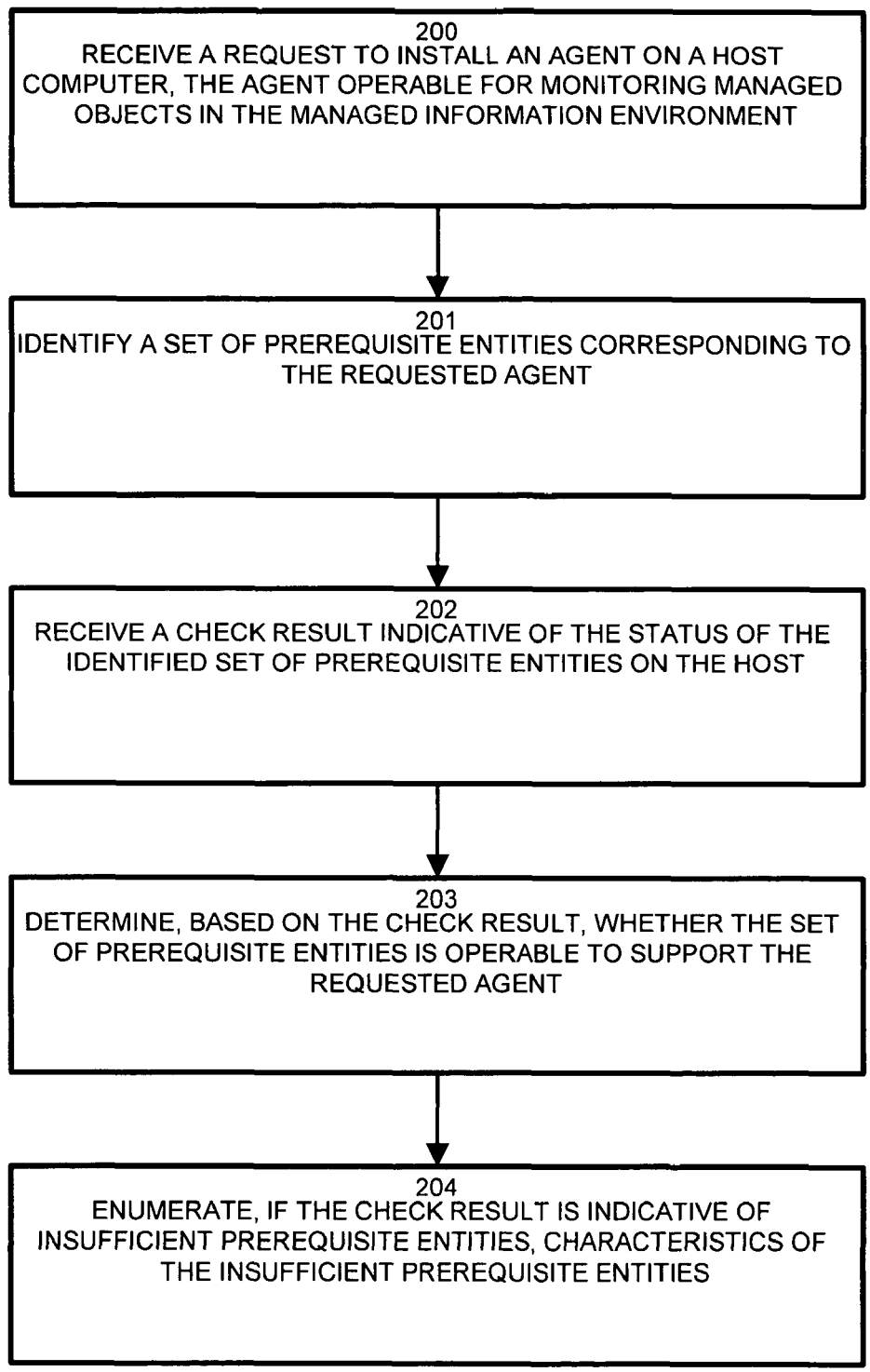
FIG. 2 is a flowchart of agent installation prerequisite checking during a bulk install as defined herein.

FIG. 2 is a flowchart of agent installation prerequisite checking as defined herein in the exemplary network of FIG. 1. The method of installing agents in the managed information environment 100 includes receiving a request to install an agent 132 on a host computer 130, in which the agents 132 are operable for monitoring managed objects 110 in the managed information environment 100, as depicted at step 200. The console 144 includes a Graphical User Interface (GUI) 146, discussed further below, and is employed for selecting the hosts 130 and agents 132 for installation thereon. The media repository 150 includes prerequisite checks, such as prerequisite scripts, for identifying a set of prerequisite entities corresponding to each of the requested agents, as depicted at step 201. The prerequisites indicate entities or resources, such as processes, services, and disk space, expected for each of the respective agents 132. Upon performance of the prerequisite checks, the server 140 receive a check result from each of the hosts 130 indicative of the status of the identified set of prerequisite entities on the host 130, as shown at step 202. In the exemplary configuration, the check result indicates the result of a comparison between an expected result and the result of the prerequisite check (prerequisite result). For example, a disk space prerequisite check expects a prerequisite result value (disk space available on the target host) of equal or greater than the expected result (known disk space demanded by the agent 132).

The server 140 determines, based on the check result, whether the set of prerequisite entities is operable to support the requested agent 132, as depicted at step 203. The host 130 sends the results of the prerequisite check performed for each agent 132, including the characteristics, or reasons, for the result. The server 140 employs the GUI 146 to enumerate, if the check result is indicative of insufficient prerequisite entities, characteristics of the insufficient prerequisite entities in a GUI screen, as shown at step 204. The characteristics indicate whether the check result is a warning or error (fatal), and the reasons and/or corrective action for remedying the prerequisite deficiency. For example, common prerequisite failure characteristics include failure to find another particular agent 132 or service, indicating a need to install and start the prerequisite process.

Figure 3:
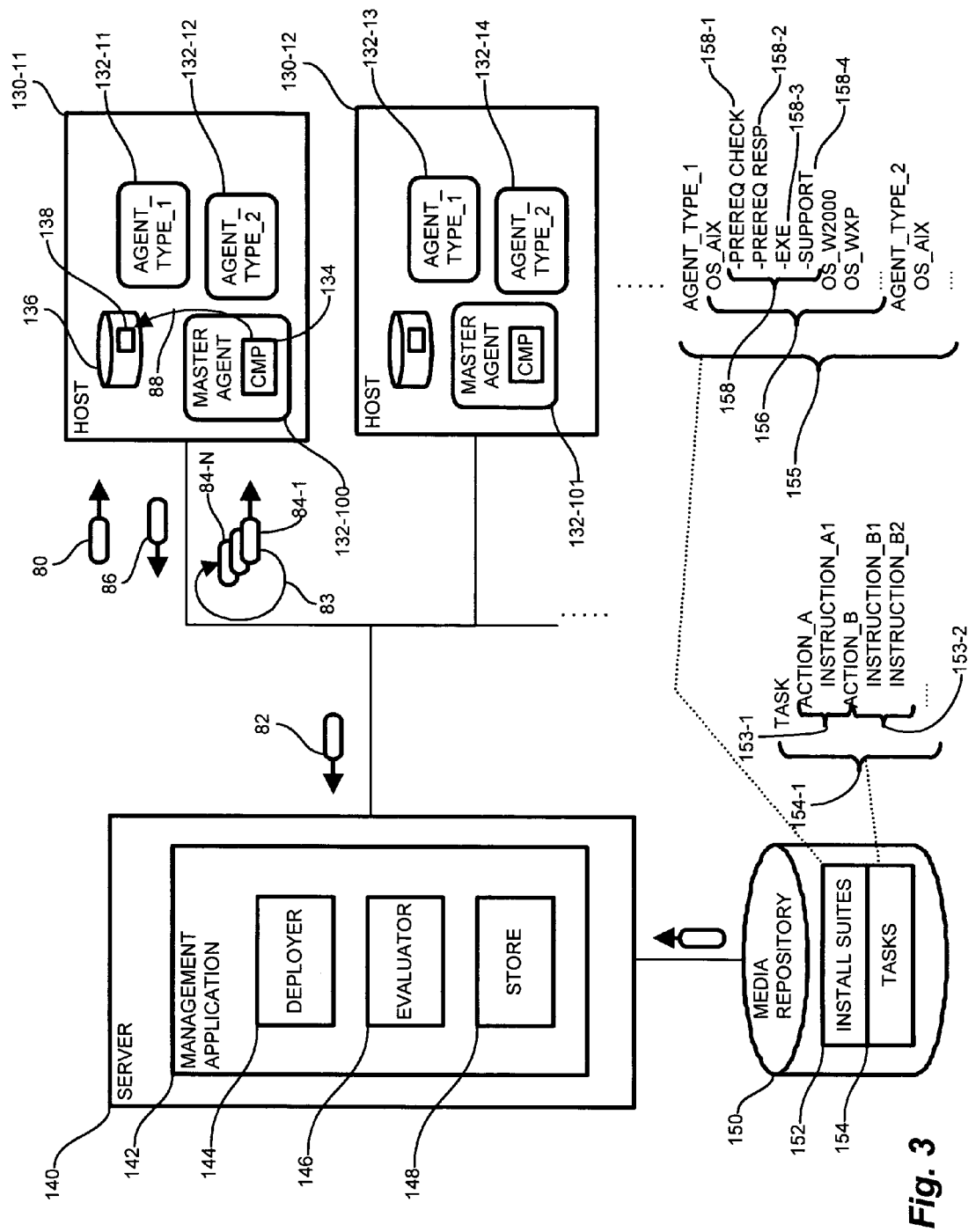
FIG. 3 is a block diagram of en exemplary storage area network performing a prerequisite check.

FIG. 3 is a block diagram of en exemplary storage area network performing a prerequisite check. Referring to FIGS. 1 and 3, the management application 142 includes a deployer 144, an evaluator 146, and a store process 148. The deployer 144 transmits files and messages to and from the hosts 130, such as agent executable files 158-3 and prerequisite check files 158-1. The evaluator 146 evaluates prerequisite check characteristics 86 returned from the hosts 130. The store process 148 searches and retrieves the files, such as install kits 158, from the media repository 150, which is organized according to agent type 155 and operating system (OS) type 156. Each of the install kits 158 includes, for the respective agent, the prerequisite checks 158-1, the expected prerequisite response 158-2, the agent executable file 158-3, and support files 158-1, discussed further below. The hosts 130 further include a master agent 132-100, 132-101, and one or more application agents 132-11-132-14. The master agent 132-100 further includes a comparator 134 for comparing the results of the prerequisite checks, discussed further below.

Continuing to refer to FIGS. 1 and 3, a discussion of the installation operation follows. Responsive to a user or operator selection via the graphical user interface (GUI) 146, discussed further below in FIGS. 8-11, a selected set of hosts 130 and requested agents 132 for each host is received by the management application 142. The store process locates, in the media repository 150, a directory of install suites 152, and retrieves an install kit 158 from the corresponding install suites 152 directory. The deployer 144 first transmits and starts the master agent 132-100, shown as message 80. Upon startup, the master agent 132-100 sends a startup acknowledgment 82 back to the deployer 144 to indicate that the master agent 132-100 is ready to proceed with installation.

For each of the selected agents 132 for installation, the deployer 144 transmits the prerequisite check 158-1 and expected prerequisite result 158-2 to the master agent 132-100 for execution, as messages 84-1.84-N. For each prerequisite check 158-1, the master agent 132-100 performs the check, discussed further below, and the comparator 134 compares it to the expected result 158-2. Such prerequisites may include, for example, be another agent 132, a service under the OS or third party software (e.g. a database service), disk space, or other resource. The deployer 144 iterates through each of the prerequisite checks for the particular agent 132 type, shown by arrow 83, and accumulates a log 138 of check results 88 in a local disk 136. For example, if agent 132-11 requires the NAVCLI service to be installed, the prerequisite check 158-1 would specify the NAVCLI process be available, and the expected prerequisite result would be a known process ID or ping response from the NAVCLI server.

Upon completion of the prerequisite checks 158-1, the master agent 132-100 responds to the server 140 with the log file 86 including the characteristics of each check result 88. The evaluator 146 processes the check results 88 for each requested agent and host, and presents the user/operator with a GUI report indicating the warnings and/or failure characteristics for further action. In response to the prerequisite characteristics, the operator may elect to correct the prerequisite, remove the offending agent 132, or proceed with the agent install despite the warning (only allowed for warnings, not failures). In this manner the user is informed, prior to commencing a task of multiple agent installs, of those installations which would have failed.

For each of the prerequisite checks 158-1, the comparator 134 writes to the log file 138 to collectively accumulate the test results by aggregating the result of each individual check 88. For example, if agent 132-11 requires 4 GB disk space on the local drive 138, and agent 132-12 requires 6 GB, and if disk 138 has only 5 GB free, the prerequisite for 132-11 will indicate success but the prerequisite check for agent 132-12 will fail. Further, if 7 GB is available, an individual check for either would pass, but the aggregate demand by both indicates that both may not be installed until space is freed on the disk 136.

Figure 4:
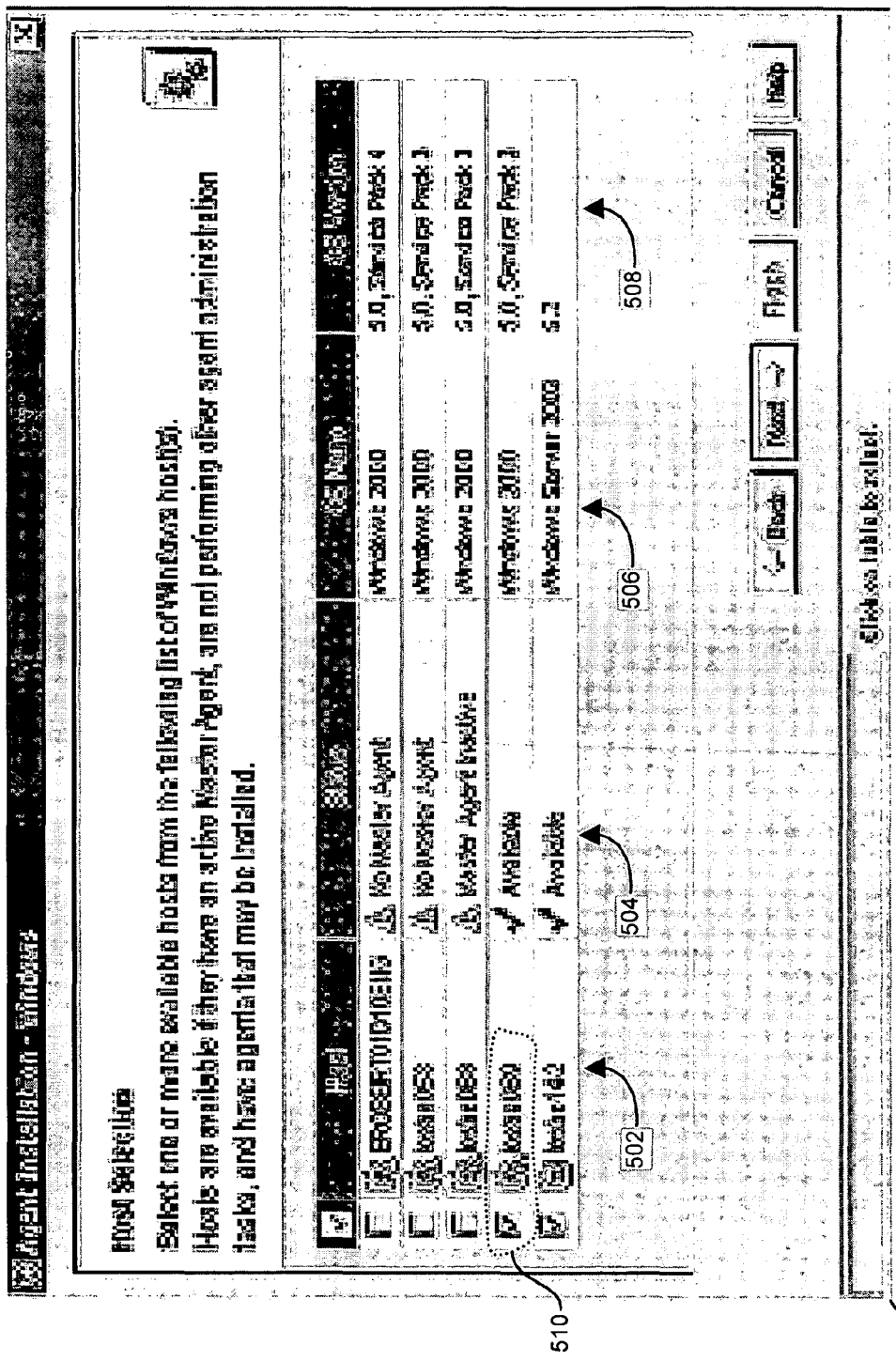
FIG. 4 is a screen diagram of host selection for installation.

FIGS. 4-7 illustrate the progression of screens through the bulk install and prerequisite check. The console 144 presents the screens on the GUI 146 as follows. FIG. 4 is a screen diagram of host 130 selection for installation. Referring to FIGS. 1, 3 and 4, the GUI 146 presents the host selection screen 500 to display available hosts 502, and allow a user to select a particular host 510 for installation. Typically, in accordance with embodiments herein, the user selects multiple hosts 502 for a particular bulk installation. Along with the name of each candidate host 510, the screen 500 also displays the current status 504, the operating system of the host 130, and the OS version 508.

Figure 5:
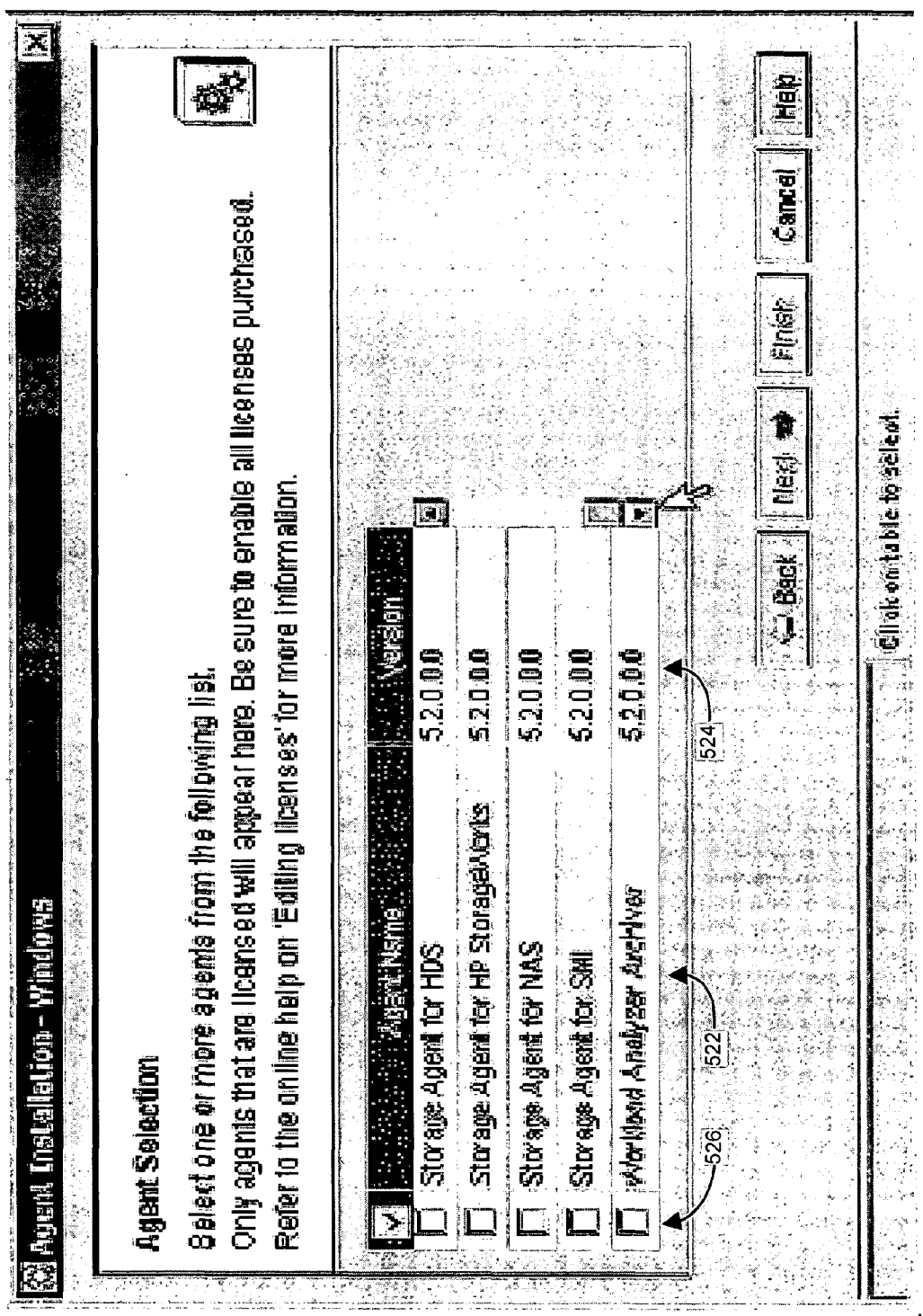
FIG. 5 is a screen diagram of agent selection for installation on a particular host.

FIG. 5 is a screen diagram of agent 132 selection for installation on a particular host 130. Referring to FIGS. 4, 5 and 3, for each selected host 510, the user selects from the available agents 522. For each agent 132, the screen 520 displays the version 524 of the agent 132 according to the management application 142. In a particular configuration, the management application 142 may the EMC Control Center, marketed commercially by EMC corporation of Hopkinton, Mass., assignee of the present application. Alternatively, other network management applications or tools may be employed. The GUI 146 allows a user to select agents 132 via a checkoff box 526.

Figure 6:
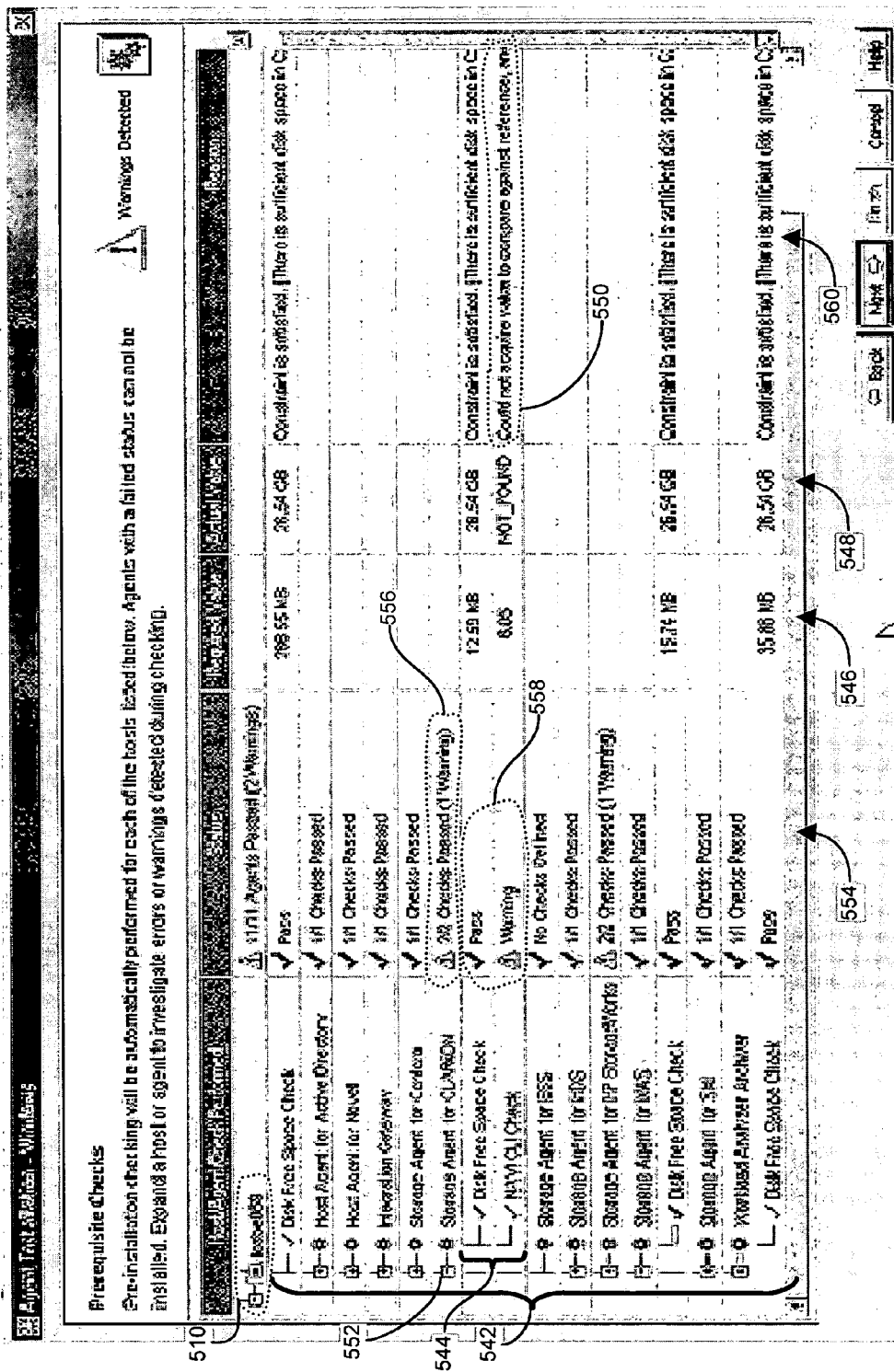
FIG. 6 is a screen diagram of prerequisite checks and corresponding prerequisite characteristics returned as a result of the checks.

FIG. 6 is a screen diagram of prerequisite checks and corresponding prerequisite characteristics returned as a result of the checks. Referring to FIGS. 3 and 6, the prerequisite screen 540 displays the prerequisite results 560 for each selected host 510. For each selected host 510, the GUI 146 displays a list of agents 542 for which prerequisite checks were performed. A drill down button 552 displays a list of each prerequisite check 544. A status column 554 displays summary counts 556 of the prerequisite checks 554. When selected via drill down button 552, the GUI 146 displays the individual prerequisite results 558 derived from each prerequisite check 158-1. Included in each prerequisite result 558 is the expected prerequisite response 158-2, in a required value column 546, and the computed check result 88 from the comparator 134 in an actual (computed) value column 548. A reason column 560 displays the characteristic 550 corresponding to each check result 558, illustrating the reason and remedial action for each insufficiency. In this manner, the user may review the characteristics of each non-pass result to take remedial action enabling the installation of the corresponding agent 132 on the selected host 510.

Figure 7:
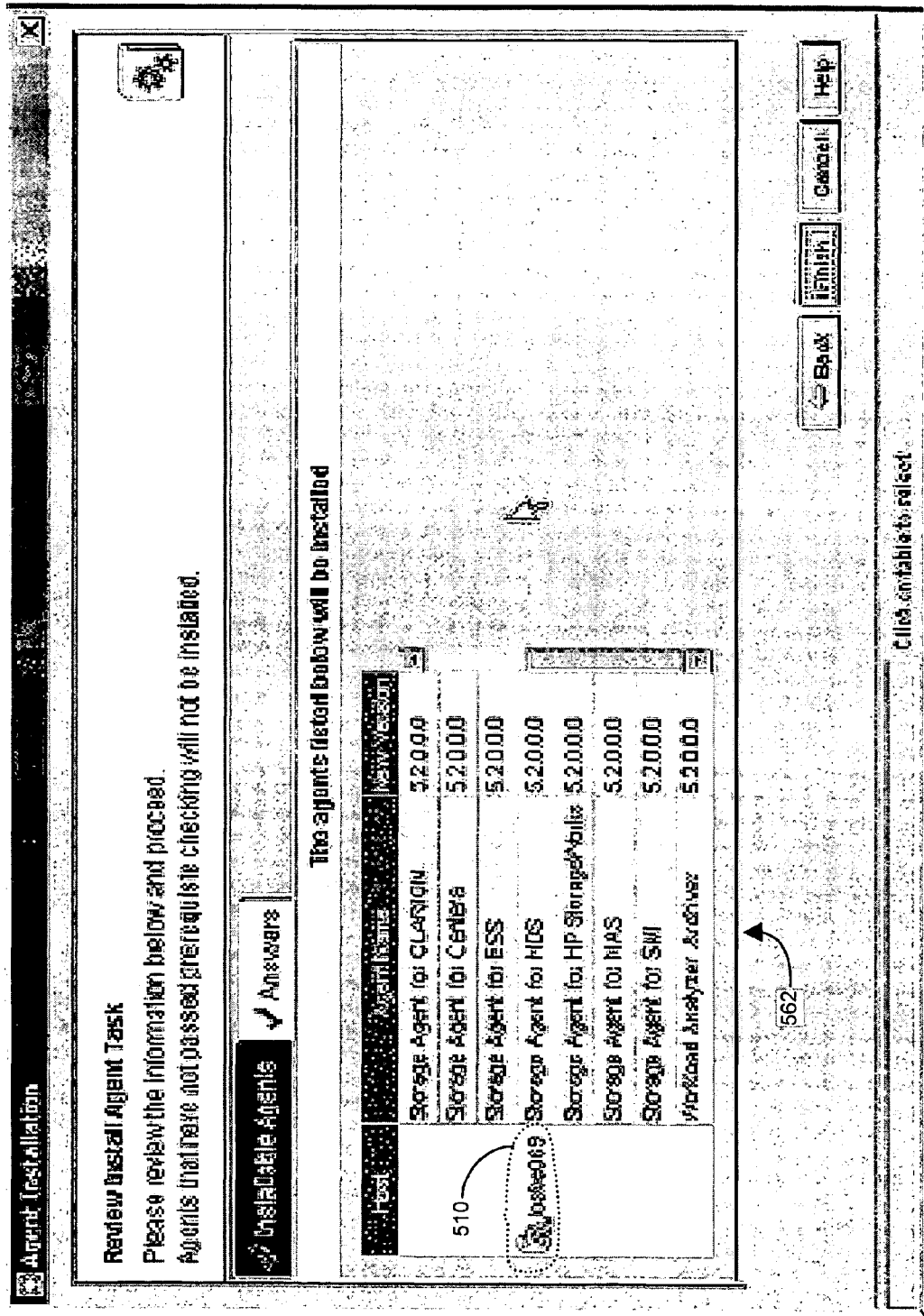
FIG. 7 is a screen diagram of a confirmatory agent install selection encompassing prerequisites and previous installations.
Figure 8:
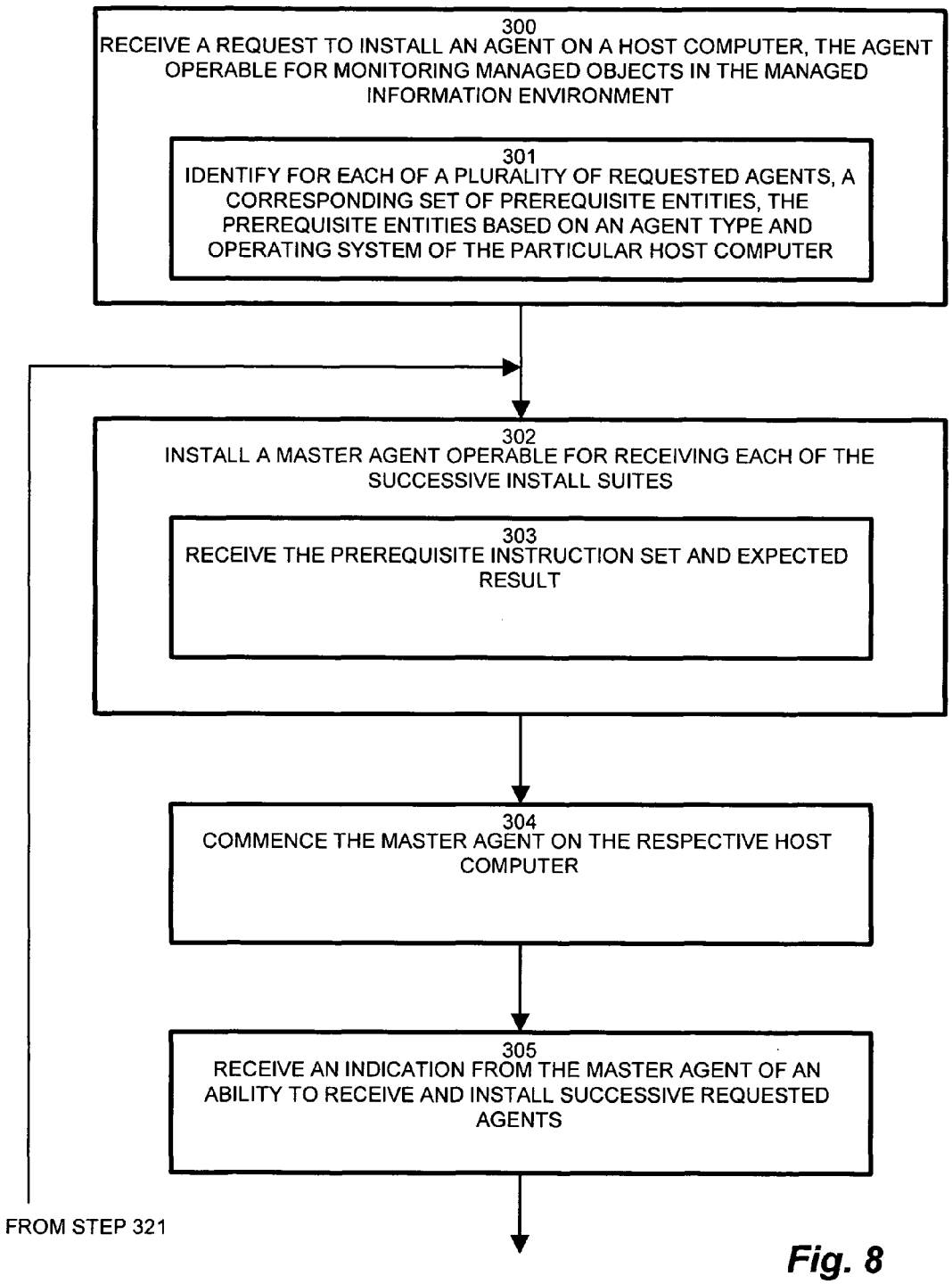
FIGS. 8-13 are a flowchart of bulk installation prerequisite checking in further detail.
Figure 9:
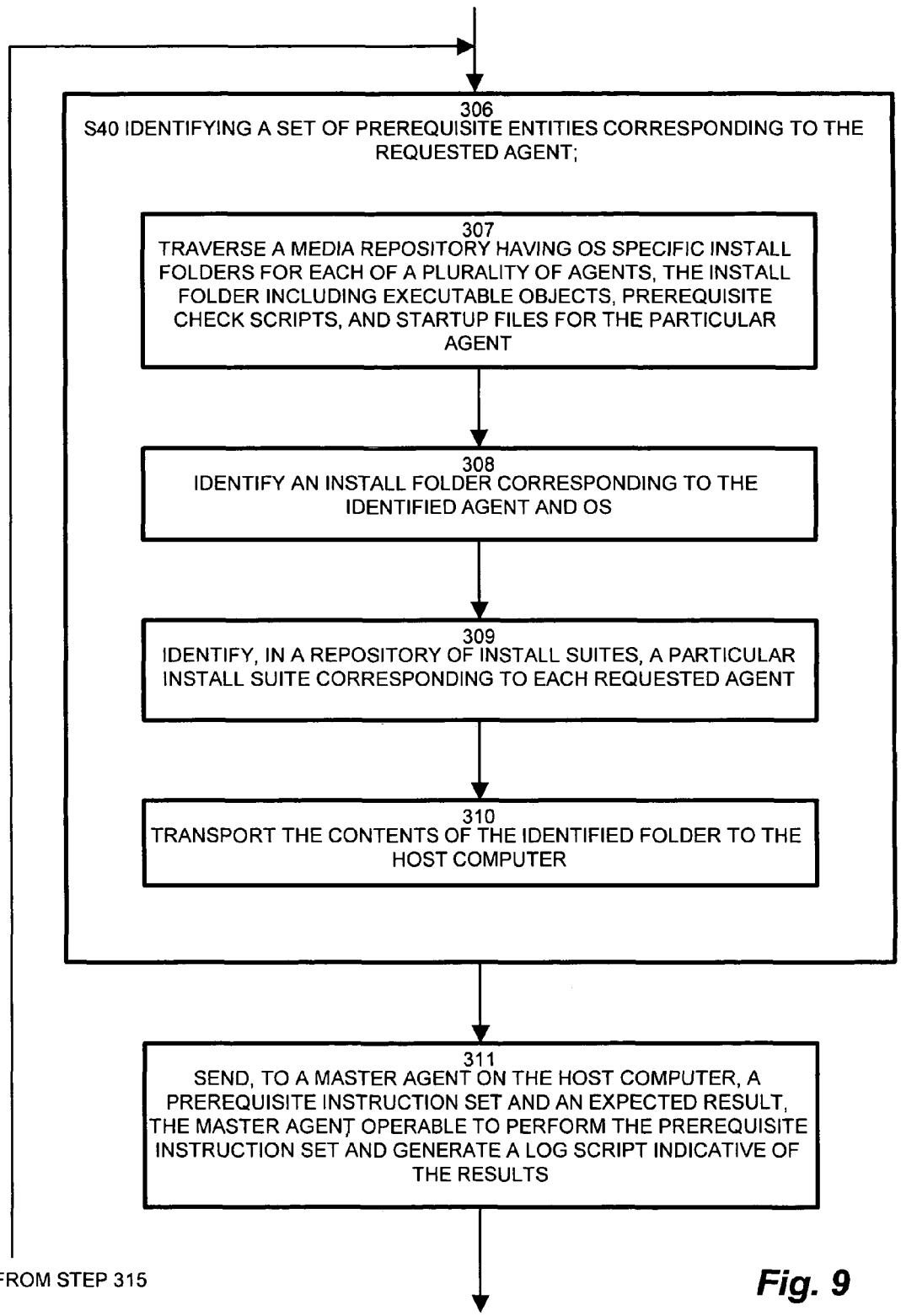
Figure 10:
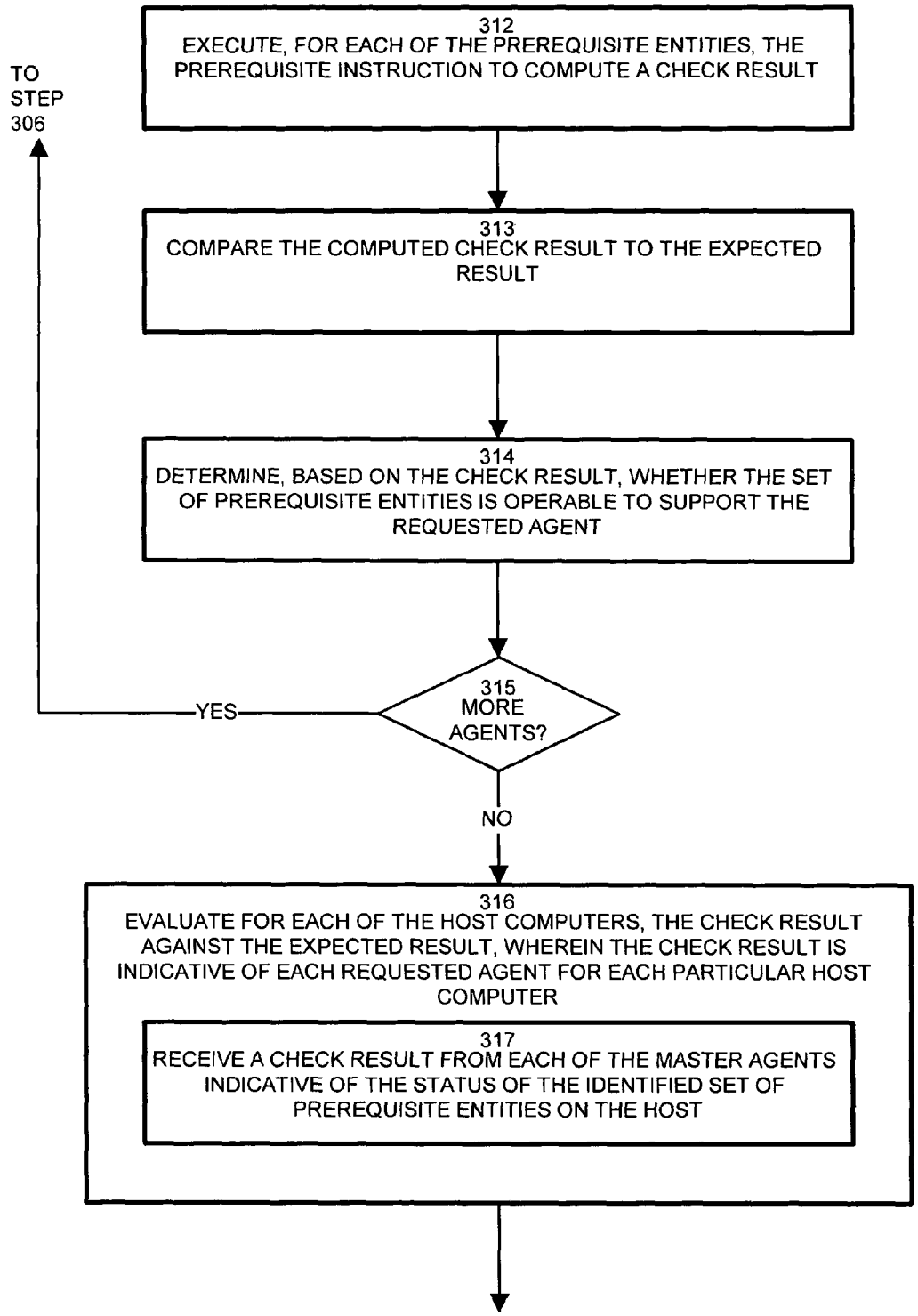
Figure 11:
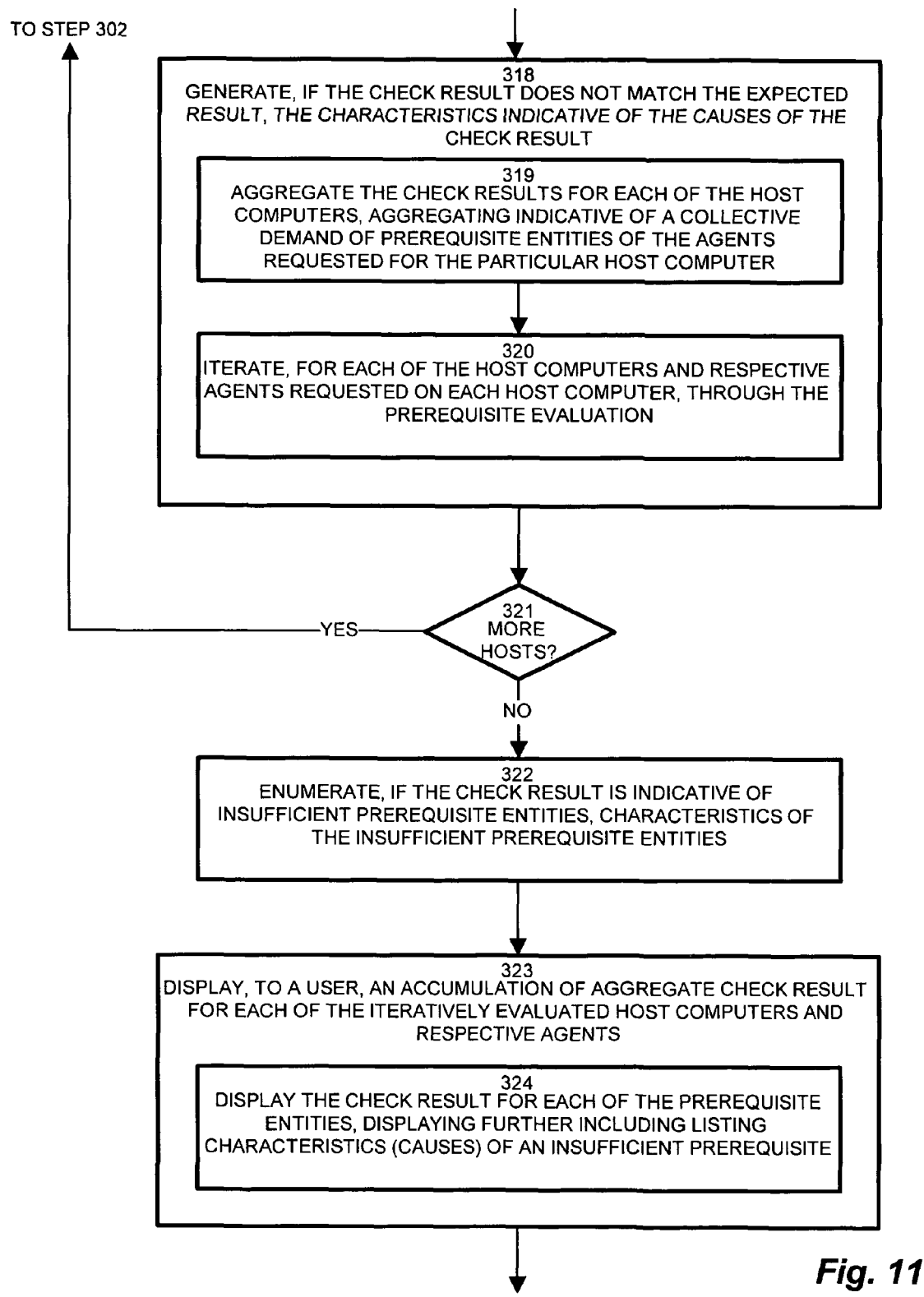
Figure 12:
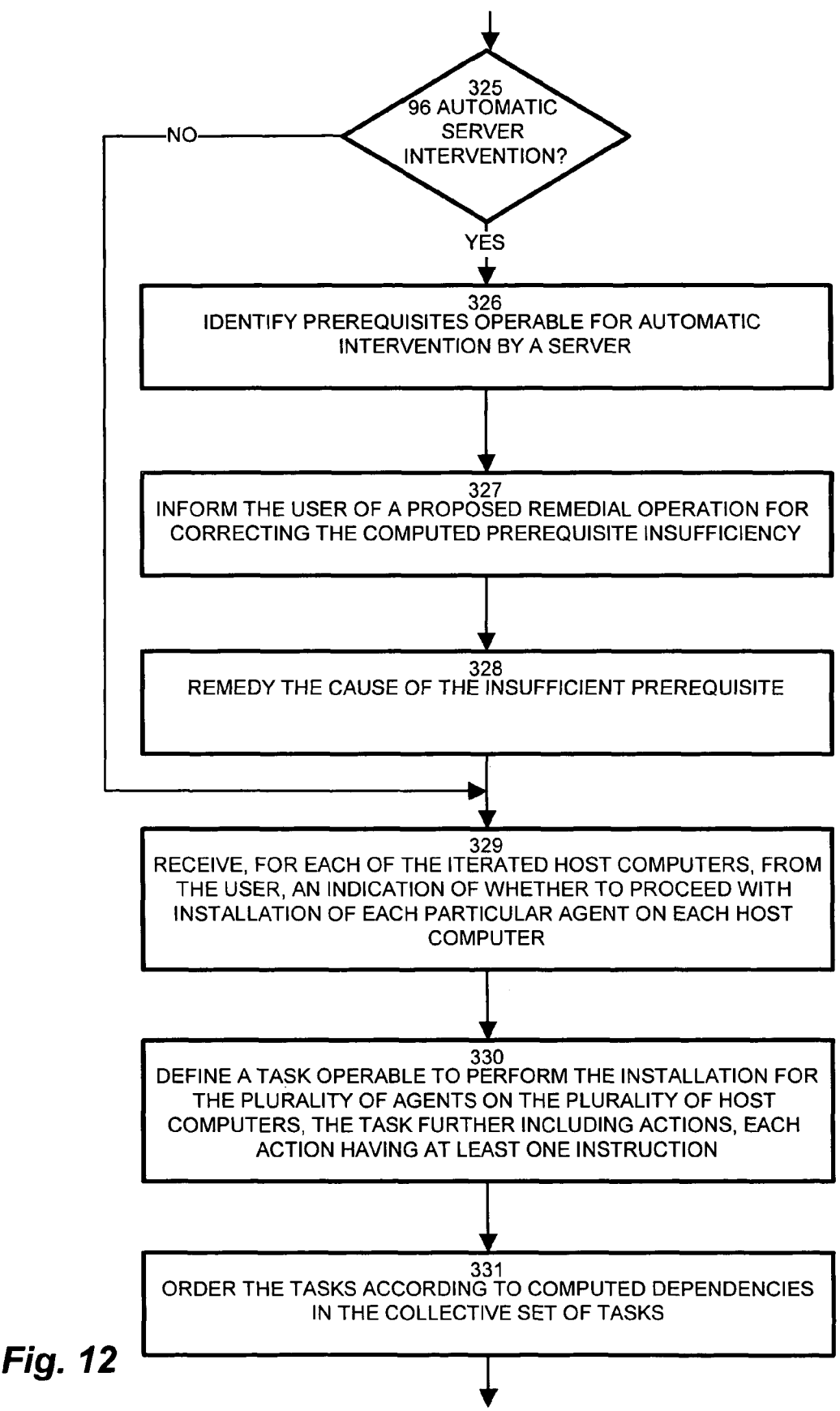
Figure 13:
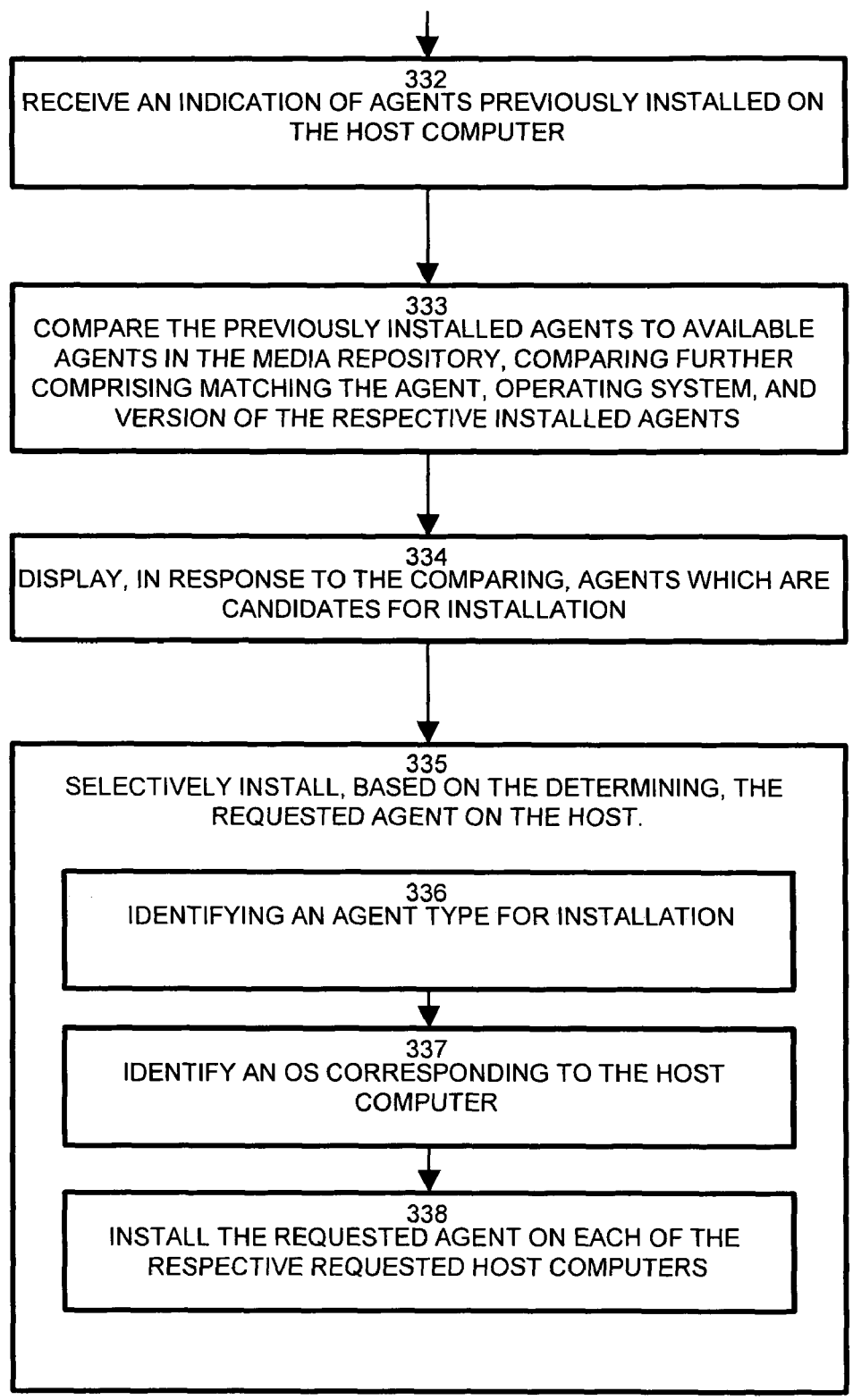

FIG. 7 is a screen diagram of a confirmatory agent install selection augmented for prerequisites and previous installations. Following review and remedial action from the prerequisite screen 540, the confirmatory install (review) screen 560 displays a final list 562 of agents for install, addressing agents 132 and/or hosts 130 removed responsive to the prerequisite screen 540, and also agents 132 already installed at the same version level which would have resulted in a redundant reinstall.

FIGS. 8-13 are a flowchart of bulk installation prerequisite checking in further detail. Referring to FIGS. 3-13, bulk installation and prerequisite checks of agents in the managed information environment 100 further include receiving a request to install an agent on a host computer 130, in which the agent 132 is operable for monitoring managed objects 110 in the managed information environment 100, as depicted at step 300. The request may be indicative of a request to install a plurality of agents 132 on one or more host computers 130, further identifying, for each of the requested agents 132, a corresponding set of prerequisite entities, specified in prerequisite checks 158-1, in which the prerequisite entities are based on an agent type and operating system of the particular host computer 130, as depicted at step 301. The various agents 132 monitor and manage many different resources, processes, and devices in the SAN 120, and, accordingly, many agent types are available. Further, each agent 132 is generally available for a plurality of supported operating systems.

For each respective host computer 130 designated in the request, the server 140 installs, or upgrades, a master agent 132-100, as depicted at step 302 and shown as message 80. The master agent 132-100 operates to facilitate installation of the other agents 132 (application agents), and performs the prerequisite checks as well as exchanging messages with the server 140 for reporting the outcome of the installation. The master agent 132-100 on each of the hosts 130 is further operable to receive the prerequisite instruction set (check) 158-1 and expected result 158-2, as shown at step 303.

The deployer 144 commences the master agent 132-100 on the respective host computer 130, as shown at step 304, and sends a startup acknowledgment 82 back to the server 140. Accordingly, the deployer 144 receives an indication from each of the commenced master agents 132-100 of an ability to receive and install successive requested agents 132, as depicted at step 305 and shown as message 82.

For each agent 132, upon receiving the startup acknowledgement 82, the deployer 144 identifies a set of prerequisite entities 158-1 corresponding to the requested agent 132, as depicted at step 306. The store process 148 traverses the install suites 152 in the media repository 150 having OS specific install folders 158 for each of a plurality of agents 132, in which the install folder 158 includes executable objects, prerequisite check scripts, and startup files for the particular agent and operating system, as shown at step 307. The store process first identifies the install folder 158 corresponding to the identified agent and OS, as disclosed at step 308, and identifies a particular install suite 158 (e.g. set of files for installation) corresponding to each requested agent 132, as depicted at step 309. The store process 148 then transports the contents of the identified folder 158 to the host computer 130, as depicted at step 310. Therefore, the management application 142 traverses the media repository 150 to find each agent-type specific and OS specific install folder 158 (suite) for the agent 132 to be installed.

Prior to actually installing the files, the deployer 144 sends, to the master agent 132-100 on the host computer 130, the prerequisite instruction set 158-1 (prerequisite check) and the expected result 158-2 (prerequisite result), in which the master agent is operable to perform the prerequisite checks 158-1 specified by the prerequisite instruction set and generate a log script 138 indicative of the results, as depicted at step 311. The master agent 132-100 executes, for each of the prerequisite entities, the prerequisite instruction set 158-1 to compute a check result 88, as depicted at step 312. The comparator 134 compares the computed check result 88 to the expected result 158-2, shown at step 313, and determines, based on the check result 88, whether the set of prerequisite entities available on the target host 130 is operable to support the requested agent 132, as depicted at step 314. In this manner, the master agent 132-100 assesses the prerequisite status of each agent 132 for installation on each host 130. A check is performed, at step 315, to determine if there are more agents for which to perform prerequisite checks 158-1 for this host.

Upon completion of prerequisite checks for a particular host 130, the master agent 132-100 evaluates, for each of the host computers 130, the check result against the expected result 158-2, in which the check result is indicative of each requested agent 132 for each particular host computer 130, as shown at step 316. Accordingly, the master agent determines a collective check result indicative of the status of the identified set of prerequisite entities on the host 130, as shown at step 317. The master agent 132-100 generates, if the check result does not match the expected result 158-2, the characteristics indicative of the causes of the check result, as shown at step 318. Generating the characteristics involves aggregating the check results for each of the host computers 130, in which aggregating for a particular host 130 is indicative of a collective demand of prerequisite entities 158-1 of the agents 132 requested for the particular host computer 130, as shown at step 319. Such activity involves iterating, for each of the host computers 130 and respective agents 132 requested on each host computer, through the prerequisite evaluation 158-1, as depicted at step 320. Therefore, the master agent 132-100 accumulates the prerequisite check result for the set of agents requested on a particular host 130. The master agent 132-100 sends the collective log file 138 back to the evaluator for each host 130. Alternatively, the log file 138 having the collective results for each host may be sent back to the server after prerequisite checks for all hosts 130. A check is performed, at step 321, to determine if there are more hosts for prerequisite evaluation, and control reverts to step 302 accordingly.

The master agent 132-100 enumerates, if the check result is indicative of insufficient prerequisite entities, characteristics of the insufficient prerequisite entities, as depicted at step 322. As indicted above, the characteristics of the prerequisite check result indicate reasons and remedial actions for correcting the prerequisite issue, such as agent, external processes, disk space, or other resource shortfall. Further, the enumeration is cognizant of the collective demand of the set of agents 132 on the host 130. In other words, continuing from the example above, if agent 132-11 requires 4 GB disk space on the local drive 138, and agent 132-12 requires 6 GB, and if disk 138 has 7 GB is available, an individual check for either would pass, but the aggregate demand by both indicates that both may not be installed until disk 138 space is freed. The characteristics indicate the collective reasons and corrective action to enable successful installation on each host. Further, as indicated below, the characteristics offer a user criteria to determine whether to abort the installation for a particular host 130 in order to allow the other host installations in the bulk install to proceed.

Upon receiving the check results from each master agent, the GUI 146 displays, to a user, an accumulation of aggregate check results for each of the iteratively evaluated host computers 130 and respective agents 130, as shown at step 323. Such displaying of the check result occurs for each of the prerequisite entities, and includes listing characteristics (causes) of an insufficient prerequisite, as depicted at step 324. The GUI 146 listing provides a visual top-level view to allow the user to assess the overall outcome of the installation by enumerating, in a line item format, each prerequisite shortfall and corresponding characteristic, or reason, for the failure or warning, as shown in FIG. 6 above.

In particular configurations, certain prerequisites may be correctable by the server 140, such as by copying or installing a missing file or service. Accordingly, a check is performed, at step 325, to determine if any of the failure characteristics are appropriate for automatic server intervention. Accordingly, the deployer 144 identifies prerequisites operable for automatic intervention by a server, as depicted at step 326, and informs the user of a proposed remedial operation for correcting the computed prerequisite insufficiency; shown at step 327. If so elected by the user, via the GUI 146, the deployer 144 remedies the cause of the insufficient prerequisite by copying or installing the missing prerequisite, or otherwise remedying the cause (i.e. by freeing disk space), as shown at step 328. For example, in a particular configuration, a storage array agent 132 available to the server 140 may be unavailable on the target host 130. In response, the deployer 144 transfers and installs the unavailable agent 132.

Now invoking the GUI 146, the user reviews and selects options concerning the prerequisite results from the log files 138. The deployer 144 prompts for user input responsive to the enumerated insufficient prerequisite entities, via the GUI 146 screen shown above in FIG. 6, and receives, for each of the iterated host computers 130, from the user, an indication of whether to proceed with installation of each particular agent on each host computer 130, as depicted at step 329.

In the particular exemplary configuration, the bulk installation including the hosts 130 is performed as a task definition. Accordingly, the deployer 144 defines a task 154-1 operable to perform the installation for the plurality of agents 132 on the plurality of host 132 computers, in which the task further including actions 153-1 . . . 153-N (153 generally), each action having at least one instruction A1 . . . AN, B1 . . . Bn, as disclosed at step 330. Task definition further includes ordering the tasks according to computed dependencies in the collective set of tasks, as shown at step 331. The tasks 154 provide a mechanism of specifying SAN operations in a readily deployable and traceable manner.

Prior to commencing the file transfer for the install, a confirmatory step is performed to itemize potential redundancies and ensure that interim changes have not nullified the previously qualified prerequisite checks (i.e. previously installed agents have not become "uninstalled"). Interim changes are also known as upgrades of previously installed agents. Accordingly, the deployer 144 receives an indication of agents 132 previously installed on the host computer, as shown at step 332, and compares the previously installed agents 132 to available agents 132 in the media repository 150, comparing the already installed files by matching the agent 132, operating system, and version of the respective installed agents, as disclosed at step 333. Responsively, the GUI 146 displays, in response to the comparison, agents 132 which are candidates for installation by displaying the subset of agents 132 which are 1) candidates for installation on a respective host 130, and 2) not already installed on the host 130, as depicted at step 334 and shown above in the confirmatory screen of FIG. 7.

Accordingly, responsive to agent review and confirmation from the screen shown in FIG. 7, the deployer 144 selectively installs, based on determining, the requested agent 132 on the host 130, as shown at step 335. Installing involves identifying the agent type for installation, depicted at step 336, identifying an OS corresponding to the host computer 130, shown at step 337, and installing the requested agent 132 on each of the respective requested host computers 130 by copying the install suite executable files 158-3 and support files 158-4. Note that the install kit 158 may have been previously copied while retrieving the prerequisite checks 158-1, or may be copied directly from the install suites 152, as disclosed at step 338. Since a plurality of hosts 130, each including one or more agents 132 for installation were confirmed on the confirmation screen, the installation proceeds in a bulk manner, according to the defined task 154-n, with confidence that prerequisites for install have been satisfied.

Those skilled in the art should readily appreciate that the programs and methods for performing bulk agent installation and prerequisite checking as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for performing bulk agent installation and prerequisite checking has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer-implemented method in which a computer system initiates execution of software instructions stored in memory for performing a bulk installation of agents in a storage area network, the computer-implemented method comprising:

receiving a request to install an agent on a host computer, the agent operable for monitoring managed objects in the storage area network, the storage area network including multiple storage arrays, connectivity devices, and databases, wherein receiving the request to install the agent includes receiving a request to install a plurality of agents across multiple remote host computers, each agent identified by agent type, operating system, and host computer;

identifying a set of prerequisite entities corresponding to the requested agent;

receiving a check result indicative of the status of the identified set of prerequisite entities on the host;

determining, based on the check result, whether the set of prerequisite entities is operable to support the requested agent; and in response to receiving the check result indicative of insufficient prerequisite entities, enumerating characteristics of the insufficient prerequisite entities.

2. The computer-implemented method of claim 1 wherein the request is indicative of a request to install a plurality of agents on at least one host computer, further comprising:

identifying, for each of the requested agents, a corresponding set of prerequisite entities, the prerequisite entities based on an agent type and operating system of the particular host computer;

evaluating, for each of the host computers, the check result, wherein the check result is indicative of each requested agent for each particular host computer;

aggregating the check results for each of the host computers, aggregating indicative of a collective demand of prerequisite entities of the agents requested for the particular host computer; and iterating, for each of the host computers and respective agents requested on each host computer, through the prerequisite evaluation.

3. The computer-implemented method of claim 2 further comprising:

displaying, to a user, an accumulation of aggregate check result for each of the iteratively evaluated host computers and respective agents; and receiving, for each of the host computers, from the user, an indication of whether to proceed with installation of each particular agent on each host computer.

4. The computer-implemented method of claim 3 further comprising:

sending, to a master agent on the host computer, a prerequisite instruction set and an expected result, the master agent operable to perform the prerequisite instruction set and generate a log script indicative of the results;

receive the check result from each of the master agents; and displaying the check result for each of the prerequisite entities, displaying further including listing characteristics of an insufficient prerequisite; and wherein the master agent on each of the host computers is further operable to:

receive the prerequisite instruction set and expected result;

execute, for each of the prerequisite entities, the prerequisite instruction to compute a check result;

compare the computed check result to the expected result; and generate, if the check result does not match the expected result, the characteristics indicative of the causes of the check result.

5. The computer-implemented method of claim 3 wherein displaying agents to the user for receiving an indication to proceed further comprises:

receiving an indication of agents previously installed on the host computer;

comparing the previously installed agents to available agents in the media repository, comparing further comprising matching the agent, operating system, and version of the respective installed agents; and displaying, in response to the comparing, agents which are candidates for installation.

6. The computer-implemented method of claim 2 further comprising:

defining a task operable to perform the installation for the plurality of agents on the plurality of host computers, the task further including actions, each action having at least one instruction; and ordering tasks according to computed dependencies in a collective set of tasks.

7. The computer-implemented method of claim 1 further comprising:

receiving user input responsive to the enumerated insufficient prerequisite entities; and selectively installing, based on the determining, the requested agent on the host.

8. The computer-implemented method of claim 7 wherein installing further comprises:

identifying an agent type for installation;

identifying an OS corresponding to the host computer;

traversing a media repository having OS specific install folders for each of a plurality of agents, the install folder including executable objects, prerequisite check scripts, and startup files for the particular agent;

identifying an install folder corresponding to the identified agent and OS; and transporting the contents of the identified folder to the host computer.

9. The computer-implemented method of claim 7 further comprising identifying prerequisites operable for automatic intervention by a server;

informing the user of a proposed remedial operation for correcting the computed prerequisite insufficiency; and remedying the cause of the insufficient prerequisite.

10. The computer-implemented method of claim 1 wherein receiving the request further comprises receiving a request for a plurality of agents, further comprising:

identifying, in a repository of install suites, a particular install suite corresponding to each requested agent; and installing each requested agent on each respective requested host computer;

installing a master agent operable for receiving each successive install suites;

commencing the master agent on each respective host computer; and receiving an indication from the master agent of an ability to receive and install successive requested agents.

11. The computer-implemented method of 1 further comprising:

traversing a media repository having operating system specific install folders for each agent in the plurality of agents, the install folders including executable objects, prerequisite check scripts, startup files for a given agent, and support files for the given agent;

installing a master agent on each host computer, each master agent coordinating transport of agent install objects according to a messaging sequence between each master agent and a common server for managing the storage area network;

sending, to each master agent on each host computer, a prerequisite instruction set and an expected result, each master agent operable to perform the prerequisite instruction set and generate a log script indicative of the results; and performing a bulk installation of the plurality of agents by iteratively installing each of the agents on a corresponding host computer.

12. The computer-implemented method of claim 11, wherein identifying the set of prerequisite entities includes performing prerequisite checks in bulk prior to the bulk installation of the plurality of agents; and wherein performing the prerequisite checks includes performing a check for collective demand of disk space required by agents to be installed on host computers.

13. The computer-implemented method of claim 12, further comprising: prior to transferring files for the bulk installation, enumerating potential redundancies to prevent interim changes from nullifying previously qualified prerequisite checks.

14. The computer-implemented method of claim 12 wherein the master agent on each of the host computers is further operable to:

receive the prerequisite instruction set and the expected result;

execute, for each of the prerequisite entities, the prerequisite instruction set to compute a check result;

compare the computed check result to the expected result; and generate, in response to the check result that does not match the expected result, the characteristics indicative of the causes of the check result.

15. The computer-implemented method of claim 12 further comprising:

receiving user input responsive to the enumerated characteristics of the insufficient prerequisite entities; and selectively installing, based on the determining, the requested agent on corresponding host computers;

identifying prerequisites operable for automatic intervention by the common server;

informing the user of a proposed remedial operation for correcting the computed prerequisite insufficiency; and remedying the cause of the insufficient prerequisite.

16. A Storage Area Network (SAN) management device for installing agents in a storage area network comprising:

a processor;

a memory unit that stores instructions associated with applications executed by the processor; and an interconnect coupling the processor and the memory unit, enabling the computer system to execute the applications and perform operations comprising:

a deployer operable to receive a request to install an agent on a host computer, the agent operable for monitoring managed objects in the storage area network, the storage area network including multiple storage arrays, connectivity devices, and databases, wherein receiving the request to install the agent includes receiving a request to install a plurality of agents across multiple remote host computers, each agent identified by agent type, operating system, and host computer;

a store process operable to identifying and retrieve a set of prerequisite entities corresponding to the requested agent;

an evaluator operable to receive a check result indicative of the status of the identified set of prerequisite entities on the host, the evaluator further operable to determine, based on the check result, whether the set of prerequisite entities is operable to support the requested agent, the evaluator in communication with a console graphical user interface (GUI) operable to enumerate, in response to receiving a check result indicative of insufficient prerequisite entities, characteristics of the insufficient prerequisite entities.

17. The storage area network management device of claim 16 further comprising a management application, the deployer, evaluator, and store process responsive to the management application, wherein the request is indicative of a request to install a plurality of agents on at least one host computer, wherein:

the store process is operable to identify, for each of the requested agents, a corresponding set of prerequisite entities, the prerequisite entities based on an agent type and operating system of the particular host computer;

the evaluator is further operable to evaluate, for each of the host computers, the check result, wherein the check result is indicative of each requested agent for each particular host computer, and further operable to aggregate the check results for each of the host computers, aggregating indicative of a collective demand of prerequisite entities of the agents requested for the particular host computer; and the management application is operable to iterate, for each of the host computers and respective agents requested on each host computer, through the prerequisite evaluation.

18. The storage area network management device of claim 17 wherein the GUI is responsive to the evaluator, the evaluator further operable to invoke the GUI to:

display, to a user, an accumulation of aggregate check result for each of the iteratively evaluated host computers and respective agents; and receive, for each of the host computers, from the user, an indication of whether to proceed with installation of each particular agent on each host computer.

19. The storage area network management device of claim 18 wherein the deployer is further operable to:

send, to a master agent on the host computer, a prerequisite instruction set and an expected result, the master agent operable to perform the prerequisite instruction set and generate a log script indicative of the results;

receive the check result from each of the master agents; and display the check result for each of the prerequisite entities, displaying further including listing characteristics of an insufficient prerequisite.

20. The storage area network management device of claim 19 wherein the master agent on each of the hosts is further operable to receive the prerequisite instruction set and expected result;

execute, for each of the prerequisite entities, the prerequisite instruction to compute a check result;

compare the computed check result to the expected result; and generate, if the check result does not match the expected result, the characteristics indicative of the causes of the check result.

21. The storage area network management device of claim 16 wherein the management application is further operable to:

identify an agent type for installation;

identify an OS corresponding to the host computer;

traverse a media repository having OS specific install folders for each of a plurality of agents, the install folder including executable objects, prerequisite check scripts, and startup files for the particular agent;

identify an install folder corresponding to the identified agent and OS; and transport the contents of the identified folder to the host computer.

22. The storage area network management device of claim 16 wherein the request further comprises a request for a plurality of agents, further comprising:
- a media repository of install suites, each of the install suite corresponding to each requested agent, the deployer operable to install the requested agent on each of the respective requested host computers; and
- wherein the deployer is further operable to, on each respective host computer:
  - install a master agent operable for receiving each successive install suites
  - commence the master agent on a respective host computer; and
  - receive an indication from the master agent of an ability to receive and install successive requested agents.

23. A computer program product having a computer readable storage medium operable to store computer program logic embodied in computer program code encoded thereon for installing agents in a storage area network comprising:
- computer program code for receiving a request to install an agent on a host computer, the agent operable for monitoring managed objects in the storage area network, the storage area network including multiple storage arrays, connectivity devices, and databases, wherein receiving the request to install the agent includes receiving a request to install a plurality of agents across multiple remote host computers, each agent identified by agent type, operating system, and host computer;
- computer program code for identifying a set of prerequisite entities corresponding to the requested agent;
- computer program code for receiving a prerequisite instruction set for evaluating existence of the set of prerequisite entities and an expected result;
- computer program code for executing, for each of the prerequisite entities, the prerequisite instruction set to compute a check result;
- computer program code for receiving the check result indicative of the status of the identified set of prerequisite entities on the host;
- computer program code for comparing the computed check result to the expected result;
- computer program code for determining, based on the check result, whether the set of prerequisite entities is operable to support the requested agent;
- computer program code for generating, in response to receiving the check result that does not match the expected result, the characteristics indicative of the causes of the check result; and
- computer program code for enumerating, in response to the check result indicative of insufficient prerequisite entities, characteristics of the insufficient prerequisite entities.

* * * * *